United States Patent
Kuo et al.

(10) Patent No.: US 10,469,183 B1
(45) Date of Patent: Nov. 5, 2019

(54) ANTENNA DEVICE AND METHOD FOR CALIBRATING ANTENNA DEVICE

(71) Applicant: Industrial Technology Research Institute, Hsinchu (TW)

(72) Inventors: Fang-Yao Kuo, Taichung (TW); Che-Yang Chiang, Hsinchu (TW); Wen-Chiang Chen, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 16/233,118

(22) Filed: Dec. 27, 2018

(30) Foreign Application Priority Data

Nov. 15, 2018 (TW) .............................. 107140521 A (51) Int. Cl.
| | |
|---|---|
| H04B 17/00 | (2015.01) |
| H01Q 3/26 | (2006.01) |
| H04W 24/00 | (2009.01) |
| H04B 17/21 | (2015.01) |
| H04B 17/12 | (2015.01) |

(52) U.S. Cl.
CPC ............ H04B 17/21 (2015.01); H01Q 3/267 (2013.01); H04B 17/12 (2015.01)

(58) Field of Classification Search
CPC ........ H04B 17/21; H04B 17/12; H04B 17/15; H04W 24/02; H04W 24/08; H01Q 3/267; H04M 1/24
See application file for complete search history.

(56) References Cited

U.S. PATENT DOCUMENTS

| | | | |
|---|---|---|---|
| 6,157,343 A | 12/2000 | Andersson et al. | |
| 6,208,287 B1 | 3/2001 | Sikina et al. | |
| 6,768,455 B1 * | 7/2004 | Werntz | H01Q 3/267 342/174 |
| 7,714,775 B2 | 5/2010 | Navarro et al. | |
| 8,184,042 B2 | 5/2012 | Ray et al. | |
| 8,692,707 B2 | 4/2014 | Lee et al. | |
| 9,331,751 B2 * | 5/2016 | Sikina | H04B 5/0043 |
| 9,705,611 B1 * | 7/2017 | West | H04B 17/12 |

(Continued)

FOREIGN PATENT DOCUMENTS

| | | |
|---|---|---|
| CN | 107666357 | 2/2018 |
| TW | I617814 | 3/2018 |

OTHER PUBLICATIONS

Miguel Alejandro et al., "Procedure for measurement, characterization, and calibration of active antenna arrays," IEEE Transactions on Instrumentation and Measurement, vol. 62, Issue 2, Feb. 2013, pp. 377-391.

(Continued)

*Primary Examiner* — Andrew Wendell
(74) *Attorney, Agent, or Firm* — JCIPRNET (57) ABSTRACT

An antenna device and a method for calibrating an antenna device are provided, and the method includes: transmitting or receiving a signal by a first antenna unit and a second antenna unit; receiving the signal from the first antenna unit and the second antenna unit or transmitting the signal to the first antenna unit and the second antenna unit by a probe, wherein the first antenna unit and the second antenna unit are at a first distance from the probe respectively; and calibrating the first antenna unit and the second antenna unit according to a beat frequency of the signal corresponding to the first distance.

12 Claims, 7 Drawing Sheets

(56) References Cited

U.S. PATENT DOCUMENTS

| | | | | |
|---|---|---|---|---|
| 2008/0129613 A1* | 6/2008 | Ermutlu | .................. | H01Q 3/267 |
| | | | | 343/703 |
| 2011/0122016 A1* | 5/2011 | Lomes | .................. | H01Q 3/267 |
| | | | | 342/174 |
| 2015/0123842 A1* | 5/2015 | Chang | ..................... | G01S 7/03 |
| | | | | 342/200 |
| 2017/0102457 A1* | 4/2017 | Li | .............................. | G01S 7/35 |
| 2017/0324161 A1* | 11/2017 | Kareisto | ................ | H01Q 3/267 |
| 2018/0062260 A1* | 3/2018 | Khalil | ................... | H04B 17/12 |
| 2018/0164407 A1 | 6/2018 | Schuman | | |
| 2018/0287651 A1* | 10/2018 | Fernando | ............. | H04B 7/0617 |
| 2018/0351250 A1* | 12/2018 | Achour | ..................... | G01S 7/03 |

OTHER PUBLICATIONS

He Qing-Qiang et al., "System error analysis and pattern calibration for a planar array antennas," Antennas Propagation and EM Theory (ISAPE), 2010 9th International Symposium on. IEEE, 2010, pp. 116-119.

Chen, Boshen, et al., "A novel on-board and amplitude-only measurement method for phase array calibration," Antennas and Propagation (APCAP), 2016 IEEE 5th Asia-Pacific Conference on. IEEE, 2016, pp. 221-222.

Yoon, J-S. et al., "Embedded loopback test for RF ICs," IEEE Transactions on Instrumentation and Measurement, vol. 54, Issue 5, Oct. 2005, pp. 1715-1720.

Schmid, Robert L., et al., "A W-band integrated silicon-germanium loop-back and front-end transmit-receive switch for built-in-self-test," Microwave Symposium (IMS), 2015 IEEE MTT-S International., 2015, pp. 1-4.

Huang, Qiulin, et al., "Mutual coupling calibration for microstrip antenna arrays via element pattern reconstruction method," IEEE Antennas and Wireless Propagation Letters, vol. 13, 2014, pp. 51-54.

* cited by examiner

ANTENNA DEVICE AND METHOD FOR CALIBRATING ANTENNA DEVICE

CROSS-REFERENCE TO RELATED APPLICATION

This application claims the priority benefits of Taiwan application serial no. 107140521, filed on Nov. 15, 2018. The entirety of the above-mentioned patent application is hereby incorporated by reference herein and made a part of this specification.

TECHNICAL FIELD

The present disclosure relates to an antenna device and a method of calibrating an antenna device.

BACKGROUND

Despite the advancements in technologies, wireless communication technologies using the millimeter wave (also referred to as mmWave) are still facing certain technical difficulties. Basically, the first problem that use of the millimeter wave may encounter is severe attenuation of wave energy during transmission, which is highly related to millimeter wave communication systems operated in high frequency bands while using a sizable bandwidth for communication. More specifically, the millimeter wave communication systems use the frequency band with relatively high frequency for communication as compared to the third generation (3G) or the fourth generation (4G) communication systems which are commonly used nowadays. It can be known that an energy intensity of an electromagnetic wave signal received by a receiver is inversely proportional to a square of a signal transmitting distance and is proportional to a wavelength of the electromagnetic wave signal, such that the attenuation degree of the signal energy will be significantly increased if the millimeter wave communication systems use the high frequency signal with short wavelength. Also, the high frequency signal will also cause sudden reduction in the antenna aperture, which may result in decrement of the signal energy of the transmitting signal in the millimeter wave communication systems. Therefore, in order to ensure the communication quality, a transceiver in the millimeter wave systems usually requires use of a multiple antenna beamforming technology to reduce the attenuation of the signal energy, so as to improve the efficiency for gaining the transceiving signals.

Multiple antenna beamforming technology is an antenna device (for example, Active Phased Array Antenna) including multiple antenna units disposed on a base station/user facility, and the antenna units are controlled to make the base station/use facility to produce a beam with directivity. The beamforming technologies accomplished by the antenna array is one of the key factors for influencing performance of a millimeter wave wireless communication system. In order to accurately adjust the shape and direction of the beam, before the amplitude and phase of the corresponding antenna unit are adjusted, the electrical difference used to feed the RF signal to the path of antenna unit needs to be calibrated. Typically, a near-field probe may be used to measure the radiated power density of each of the antenna units to calibrate the antenna unit, or to exhaustively measure the voltage of each of the antenna units at each different phase to create a lookup table, and each of the antenna units is calibrated according to the lookup table. However, conventional calibration methods are found to have a number of problems, for example, the calibration method using near-field probes can only be performed at limited sites (e.g., a qualified electronic device calibration laboratory). On the other hand, when the total number of antenna units is too large, the calibration method using the lookup table will consume a large amount of computing operations.

SUMMARY

In order to perform on-line calibration of an antenna device more efficiently, the present disclosure provides an antenna device and a method of calibrating the antenna device.

The present disclosure provides an antenna device including an antenna array and a control circuit. The antenna array includes a first antenna unit, a second antenna unit, and a probe. The first antenna unit and the second antenna unit are used to transmit or receive signals. The probe is configured to receive signals from the first antenna unit and the second antenna unit or transmit signals to the first antenna unit and the second antenna unit, wherein the first antenna unit and the second antenna unit are respectively spaced apart from the probe at a first distance. A control circuit is coupled to an antenna array, and calibrates the first antenna unit and the second antenna unit according to a beat frequency of the signal corresponding to the first distance.

The present disclosure provides a method for calibrating an antenna device, the method including transmitting or receiving a signal through a first antenna unit and a second antenna unit; receiving a signal from the first antenna unit and the second antenna unit or transmitting a signal to the first antenna unit and the second antenna unit, wherein the first antenna unit and the second antenna unit are respectively spaced apart from the probe at a first distance; calibrating the first antenna unit and the second antenna unit according to a beat frequency of the signal corresponding to the first distance.

Based on the above, the method for calibrating the antenna device of the present disclosure may be performed at a site with background signal noise, and there is no need to measure the voltage of each antenna unit at each different phase to create a lookup table, so the method can save a large amount of computing operation.

Several exemplary embodiments accompanied with figures are described in detail below to further describe the disclosure in details.

DESCRIPTION OF EMBODIMENTS

In order to perform on-line calibration of an antenna device more efficiently, the present disclosure provides an antenna device and a method for calibrating an antenna device that can be used to calibrate one or more pairs of antenna units on an antenna array.

Figure 1:
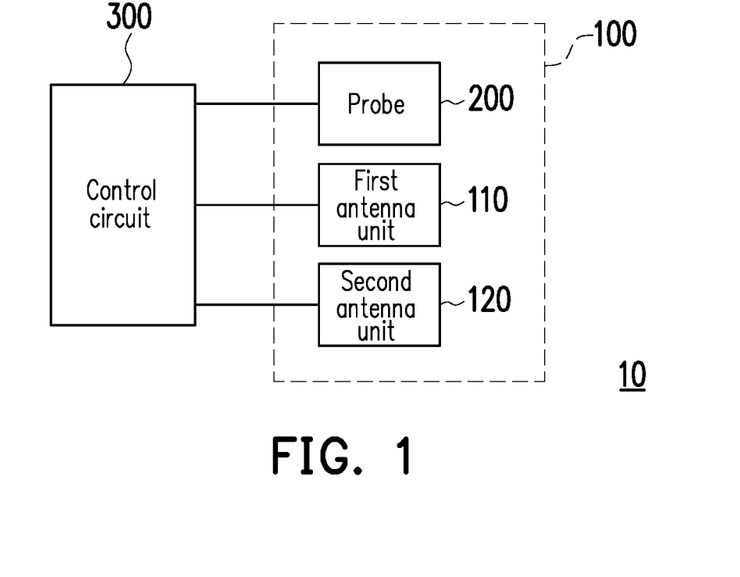
FIG. 1 is a schematic view illustrating an antenna device according to an embodiment of the disclosure.

FIG. 1 illustrates a schematic view of an antenna device 10 according to an embodiment of the present disclosure. The antenna device 10 may include an antenna array 100 and a control circuit 300, wherein the control circuit 300 is coupled to the antenna array 100. The control circuit 300 may be implemented as, for example, a central processing unit (CPU), or other programmable general-purpose or specific-purpose microprocessor, a digital signal processor (DSP), a programmable controller, an Application Specific Integrated Circuit (ASIC) or the like, or a combination of the above units, the disclosure is not limited thereto.

The antenna array 100 may include a first antenna unit 110, a second antenna unit 120, and a probe 200. The number of antenna units on the antenna array 100 may be adjusted by the user depending on the requirement of the adopted beamforming technique, and the disclosure is not limited thereto. The first antenna unit 110, the second antenna unit 120, and each of the antenna units on the antenna array 100 may be used to transmit or receive signals (e.g., radio frequency signals). The probe 200 may be configured to receive signals from the first antenna unit 110 and the second antenna unit 120 or transmit signals to the first antenna unit 110 and the second antenna unit 120.

In this embodiment, the antenna units are calibrated in pairs. Taking the first antenna unit 110 and the second antenna unit 120 as an example, when the calibration of the antenna device 10 is performed, if the first antenna unit 110 and the second antenna unit 120 are used to transmit a signal for calibration, the probe 200 is used to receive signals for calibration from the first antenna unit 110 and the second antenna unit 120, and the control circuit 300 calibrates the first antenna unit 110 and the second antenna unit 120 according to the signal received by the probe 200. On the other hand, if the first antenna unit 110 and the second antenna unit 120 are used to receive the signal for calibration, the probe 200 is used to transmit the signal for calibration to the first antenna unit 110 and the second antenna unit 120, and the control circuit 300 calibrates the first antenna unit 110 and the second antenna unit 120 according to the signals received by the first antenna unit 110 and the second antenna unit 120. For ease of description, in the following embodiments, the first antenna unit 110 and the second antenna unit 120 are used to transmit signals for calibration, and the probe 200 is used to receive the signal for calibration from the first antenna unit 110 and second antenna unit 120, but the disclosure is not limited thereto.

Figure 2:
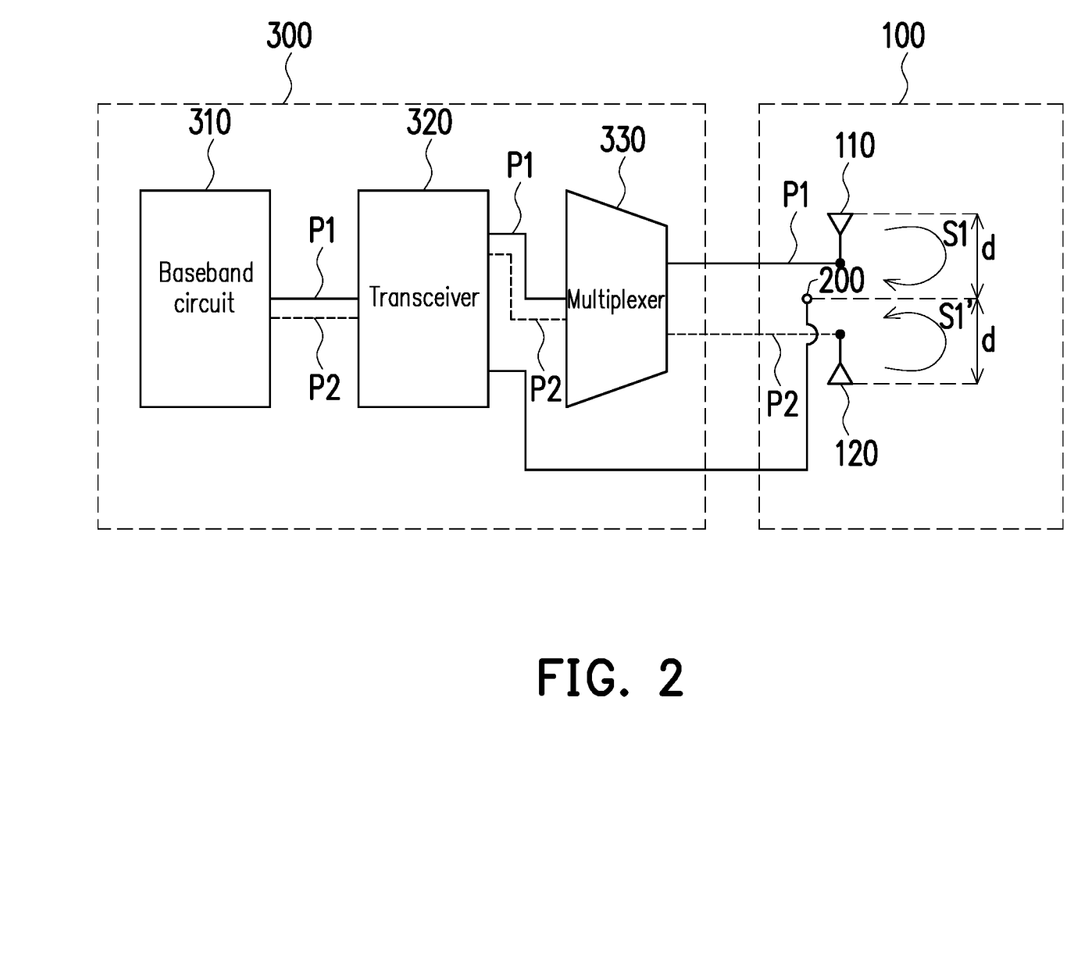
FIG. 2 is a schematic view further illustrating an antenna device according to an embodiment of the disclosure.
Figure 3A:
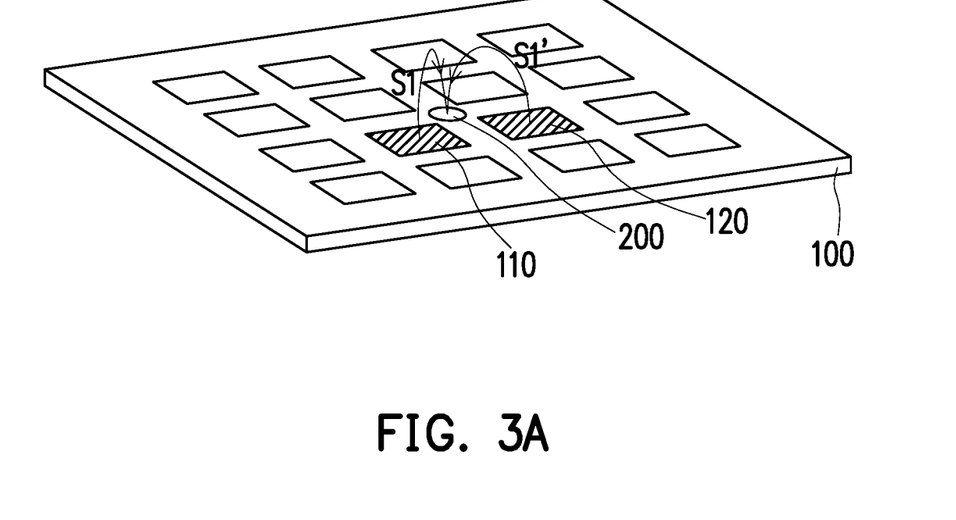
FIG. 3A and FIG. 3B are schematic diagrams illustrating an antenna array when a pair of antenna units are calibrated according to an embodiment of the disclosure.
Figure 3B:
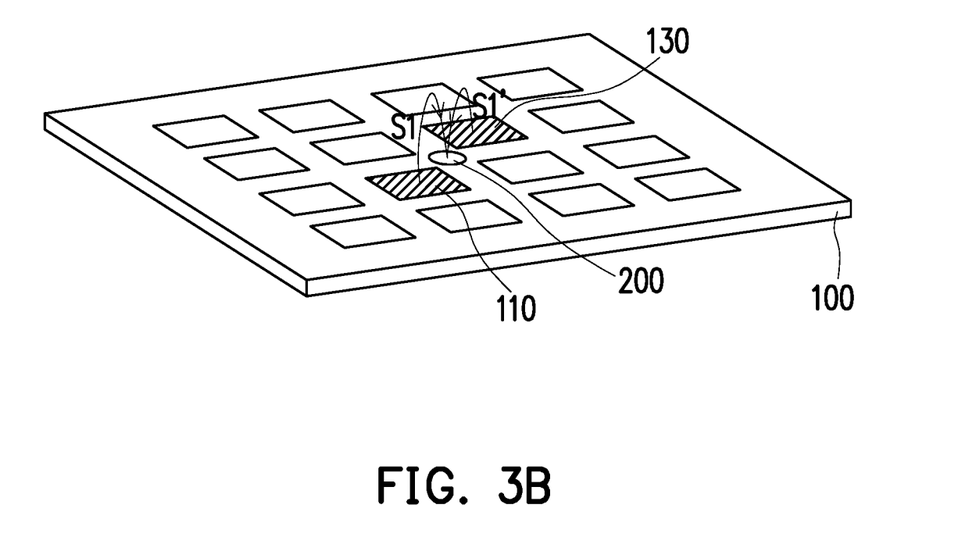

FIG. 2 is a schematic view further illustrating the antenna device 10 according to an embodiment of the disclosure. As shown in FIG. 2, the control circuit 300 may include a baseband circuit 310, and other circuits such as a transceiver 320 and a multiplexer 330 and the like may exist between the baseband circuit 310 and the first antenna unit 110 or the second antenna unit 120, the disclosure is not limited thereto. The first antenna unit 110 and the second antenna unit 120 are respectively spaced apart from the probe 200 by a first distance d. For example, the probe 200 may be disposed at a central position of the antenna array 100, as shown in FIG. 3A and FIG. 3B. FIG. 3A and FIG. 3B are schematic diagrams illustrating the antenna array 100 when a pair of antenna units (i.e., first antenna unit 110 and second antenna unit 120) are calibrated according to an embodiment of the disclosure. When performing the calibration, the antenna device 10 may enable a pair of antenna units (i.e., first antenna unit 110 and second antenna unit 120) symmetric to the probe 200 and disable other antenna units on the antenna array 100. In other words, when performing the calibration, the antenna device 10 may enable the first antenna unit 110 and the second antenna unit 120 respectively spaced apart from the probe 200 at the same distance (i.e., the first distance d as shown in FIG. 2), thereby performing calibration of the first antenna unit 110 and the second antenna unit 120.

Referring back to FIG. 2, when the first antenna unit 110 and the second antenna unit 120 of the antenna array 100 are used to transmit signals, the baseband signal transmitted by the baseband circuit 310 may be transmitted to the first antenna unit 110 through the path P1 between the baseband circuit 310 and the first antenna unit 110, and may be transmitted to the second antenna unit 120 through the path P2 between the baseband circuit 310 and the second antenna unit 120. On the other hand, when the first antenna unit 110 and the second antenna unit 120 of the antenna array 100 receive signals, the radio frequency signal received by the first antenna unit 110 may be transmitted to the baseband circuit 310 through the path P1, and the radio frequency signal received by the second antenna unit 120 may be transmitted to the baseband circuit 310 through the path P2.

In general, since both of the first antenna unit 110 and the second antenna unit 120 are spaced apart from the probe 200 by the first distance d, when the first antenna unit 110 and the second antenna unit 120 are used to transmit the same baseband signal (i.e., the baseband signals for calibration), the phase or amplitude of the signal (the RF signal for calibration) S1 received by the probe 200 from the first antenna unit 110 should be the same as the signal (the RF signal for calibration) S1' received by the probe 200 from the second antenna unit 120. However, the path P1 and the path P2 may respectively have different electronic components, and the difference between the different electronic components may cause an electrical difference between the path P1 and the path P2, thereby causing the phase or amplitude of the signal radiated by the first antenna unit 110 to be different from the phase or amplitude of the signal radiated by the second antenna unit 120. Therefore, before the antenna device 10 is not calibrated, the signal S1 received by the probe 200 from the first antenna unit 110 may be different from the signal S1' received by the probe 200 from the second antenna unit 120.

Figure 4:
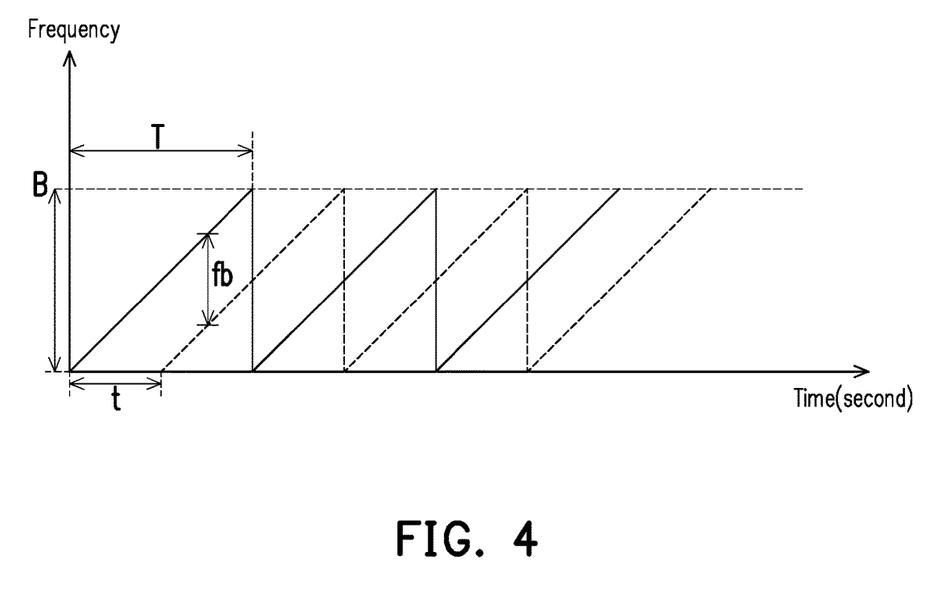
FIG. 4 is a schematic diagram illustrating calculating a beat frequency of a frequency-modulated continuous-wave according to an embodiment of the present disclosure.

In order to calibrate the antenna device 10 such that the signal S1 received by the probe 200 from the first antenna unit 110 is identical to the signal S1' received by the probe 200 from the second antenna unit 120, the present disclosure proposes a method utilizing the characteristics of the beat frequency of a frequency-modulated continuous-wave (FMCW) to calibrate the first antenna unit 110 and the second antenna unit 120. FIG. 4 is a schematic diagram illustrating calculating a beat frequency of a frequency-modulated continuous-wave according to an embodiment of the present disclosure.

According to FIG. 4, it is assumed that the period of the FMCW is T, the sweep frequency of the FMCW is B, and the time interval between the time point at which the FMCW is transmitted by the transmitting end (e.g., first antenna unit 110 or second antenna unit 120) and the time point at which the FMCW is received by the receiving end (for example, the probe 200) is t seconds, and the beat frequency fb of the FMCW can be derived according to the following equations:

$$t=d/c \qquad \text{equation (1)}$$

$$t/T=fb/B \qquad \text{equation (2)}$$

$$fb=(B*d)/(c*T) \qquad \text{equation (3)}$$

wherein c is light velocity, d is the distance (e.g., the first distance d) between the transmitting end (e.g., the first antenna unit 110 or the second antenna unit 120) and the receiving end (e.g., the probe 200) of the FMCW. It can be seen from equation (3) that in the case wherein the distance d is constant and the adopted FMCW is constant (that is, the period T and the sweep frequency B of the FMCW are constant), the beat frequency fb does not change. Accordingly, the control circuit 300 shown in FIG. 1 or FIG. 2 may calibrate the first antenna unit 110 and the second antenna unit 120 according to the beat frequency of the signal corresponding to the first distance d based on the characteristic that the beat frequency fb is constant. Based on the above, the method for calibrating the antenna device of the present disclosure can accurately perform calibration based on the characteristics of the constant beat frequency fb even if it is performed with background signal noise. Thus, the method of the present disclosure can be performed at any site without having to limit the location of operation to a qualified electronic device calibration laboratory.

Specifically, since the first antenna unit 110 and the second antenna unit 120 are both spaced apart from the probe 200 by the first distance d, when calibration of the antenna device 10 has been completed (i.e., when the first antenna unit 110 and the second antenna unit 120 are used to transmit the same baseband signal, the RF signal radiated by the first antenna unit 110 and the RF signal radiated by the second antenna unit 120 have the same phase or amplitude), the phase of the signal S1 transmitted by the first antenna unit 110 to the probe 200 should be the same as the phase of the signal S1' transmitted by the second antenna unit 120 to the probe 200. Thus, the signal S1 and the signal S1' can generate constructive interference, and the interference wave signal generated by the signal S1 and the signal S1' at the probe 200 will generate the maximum amplitude at the beat frequency fb. In other words, if the antenna device 10 is to be calibrated, the control circuit 300 may adjust the phase (or amplitude) of the first antenna unit 110 or the second antenna unit 120 to make the signal (i.e., the interference wave signal generated at the probe 200 by the signal S1 and the signal S1') received by the probe 200 to reach a preset maximum value at the beat frequency fb.

Figure 5A:
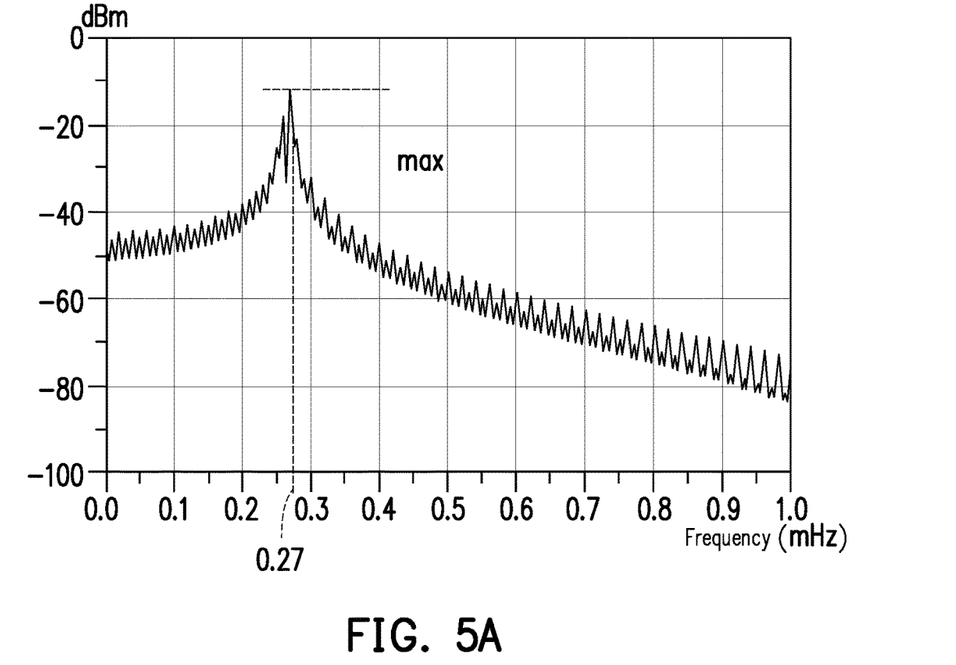
FIG. 5A is a schematic diagram illustrating constructive interference of interference wave signals according to an embodiment of the present disclosure.

FIG. 5A is a schematic diagram illustrating constructive interference of interference wave signals according to an embodiment of the present disclosure. Please refer to FIG. 2 and FIG. 5A, in this embodiment, it is assumed that the first antenna unit 110 and the second antenna unit 120 are respectively spaced apart from the probe 200 by the first distance d, and the beat frequency fb corresponding to the first distance d is fb=0.27 MHz. Therefore, when the control circuit 300 is to calibrate the first antenna unit 110 and second antenna unit 120, the control circuit 300 may adjust the phase (or amplitude) of the first antenna unit 110 or the second antenna unit 120 to make the signal (i.e., the interference wave signal generated by the signal S1 and the signal S1' at the probe 200) received by the probe 200 to reach a preset maximum value max at a beat frequency fb=0.27 MHz.

In some embodiments, the control circuit 300 may also calibrate the first antenna unit 110 and the second antenna unit 120 such that the signal radiated by the first antenna unit 110 and the signal radiated by the second antenna unit 120 are opposite in phase (i.e., the phase difference is 180 degrees). Thus, the signal S1 and the signal S1' can generate destructive interference, and the interference wave signal generated by the signal S1 and the signal S1' at the probe 200 will generate a minimum amplitude at the beat frequency fb. That is, the control circuit 300 may adjust the phase (or amplitude) of the first antenna unit 110 or the second antenna unit 120 such that the signal (i.e., the interference wave signal generated by the signal S1 and the signal S1') received by the probe 200 reaches a preset minimum value min at the beat frequency fb. In other words, the control circuit 300 may adjust the phase (or amplitude) of the first antenna unit 110 or the second antenna unit 120 such that the signal received by the probe 200 reaches a random preset value at the beat frequency fb. In some embodiments, when the control circuit 300 causes the signal received by the probe 200 to reach a preset maximum value max at the beat frequency fb, it may represent that the antenna device 10 is to calibrate the first antenna unit 110 and the second antenna unit 120 to have the same phase. On the other hand, when the control circuit 300 causes the signal received by the probe 200 to reach the preset minimum value min at the beat frequency fb, it may represent that the antenna device 10 is to calibrate the first antenna unit 110 and the second antenna unit 120 to have opposite phases. In the same manner, the user may set the preset value randomly according to the needs to calibrate the first antenna unit 110 and the second antenna unit 120 having the same/different phase.

Figure 5B:
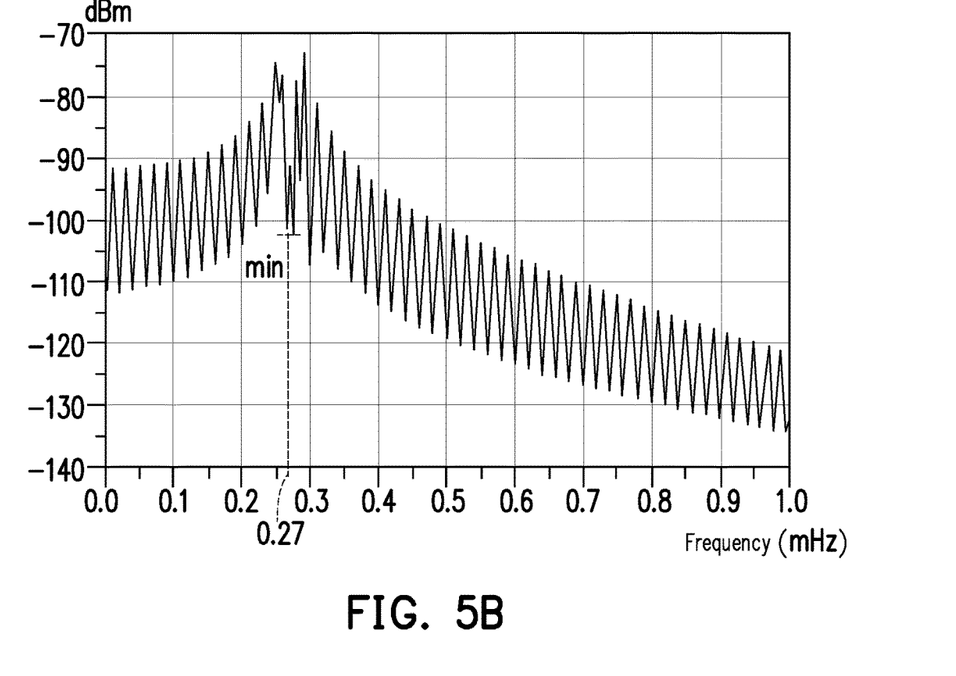
FIG. 5B is a schematic diagram showing destructive interference of interference wave signals according to an embodiment of the present disclosure.

FIG. 5B is a schematic diagram showing destructive interference of interference wave signals according to an embodiment of the present disclosure. Please refer to FIG. 2 and FIG. 5B. In this embodiment, it is assumed that the first antenna unit 110 and the second antenna unit 120 are respectively spaced apart from the probe 200 by the first distance d, and the beat frequency fb corresponding to the first distance d is fb=0.27 MHz. Therefore, when the control circuit 300 is to calibrate the first antenna unit 110 and the second antenna unit 120 such that the signal radiated by the first antenna unit 110 and the signal radiated by the second antenna unit 120 have opposite phases, the control circuit 300 may adjust the phase (or amplitude) of the first antenna unit 110 or the second antenna unit 120 such that the signal (i.e., the interference wave signal generated by the signal S1 and the signal S1' at the probe 200) received by the probe 200 reaches a preset minimum value min at the beat frequency fb=0.27 MHz.

In some embodiments, the antenna device 10 may calibrate all antenna units on the antenna array 100 based on a certain order to minimize the process flow required to calibrate the entire antenna array 100. For example, in the calibration of the first antenna unit 110 and the second antenna unit 120, among the respective antenna units on the antenna array 100, only the first antenna unit 110 and the second antenna unit 120 are enabled (as shown in FIG. 3A), and the remaining antenna units are disabled. After the control circuit 300 calibrates the first antenna unit 110 and the second antenna unit 120, the control circuit 300 may disable the second antenna unit 120 and enable a third antenna unit 130 that is also at the first distance d from the probe 200 (i.e., the distance between the third antenna unit 130 and the probe 200 is the same as the distance between the first antenna unit 110 and the probe 200), such that only the first antenna unit 110 and third antenna unit 130 among the antenna units on the antenna array 100 are enabled (as shown in FIG. 3B). As such, the control circuit 300 may calibrate the third antenna unit 130 according to a beat frequency corresponding to the calibrated first antenna unit 110 and the third antenna unit 130 that has not been calibrated. Specifically, the control circuit 300 may adjust the third antenna unit 130 such that the phase of the signal S1' transmitted by the third antenna unit 130 is the same as the phase of the signal S1 transmitted by the first antenna unit 110.

In some embodiments, the control circuit 300 may simultaneously calibrate two pairs (or more) of antenna units on antenna array 100. As described above, when the first antenna unit 110 and the second antenna unit 120 are respectively at the same distance (i.e., the first distance d) from the probe 200, the control circuit 300 may adjust the phase (or amplitude) of the first antenna unit 110 and the second antenna unit 120 such that the interference wave signal generated by the signal S1 and the signal S1' at the probe 200 reaches a preset maximum value at a beat frequency fb corresponding to the first distance d. Therefore, if the first pair of antenna units are respectively spaced apart from the probe 200 by the first distance d, the control circuit 300 may calibrate the first pair of antenna units by using a beat frequency fb corresponding to the first distance d. In other words, if the second pair of antenna units are respectively spaced apart from the probe 200 by a second distance d2 different from the first distance d, the control circuit 300 may utilize the beat frequency (which is different from the beat frequency fb corresponding to the first distance d) corresponding to the second distance d2 to calibrate the second pair of antenna units while the first pair of antenna units are being calibrated by using the beat frequency fb corresponding to the first distance d.

Figure 6A:
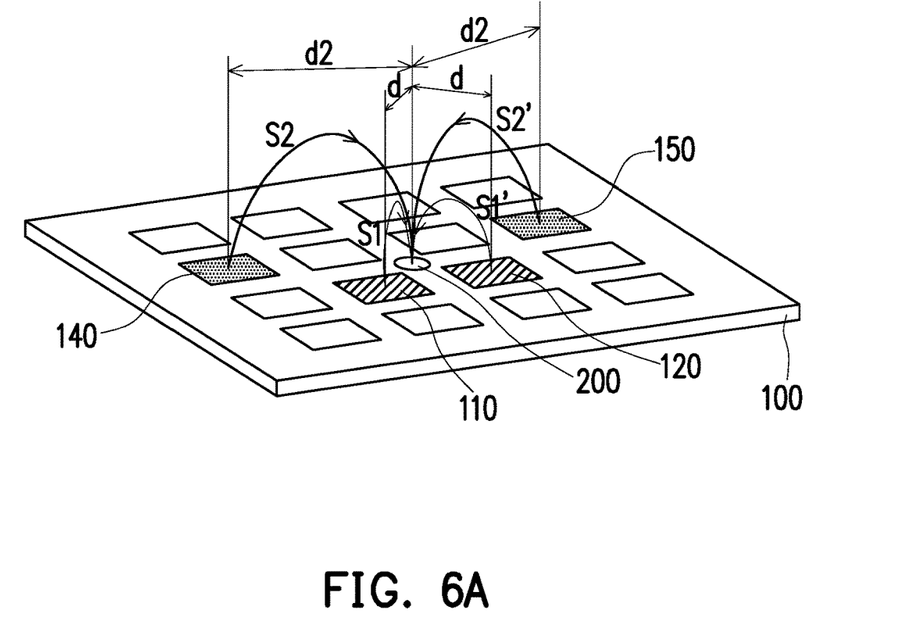
FIG. 6A and FIG. 6B are schematic diagrams illustrating an antenna array when two pairs of antenna units are simultaneously calibrated according to an embodiment of the present disclosure.
Figure 6B:
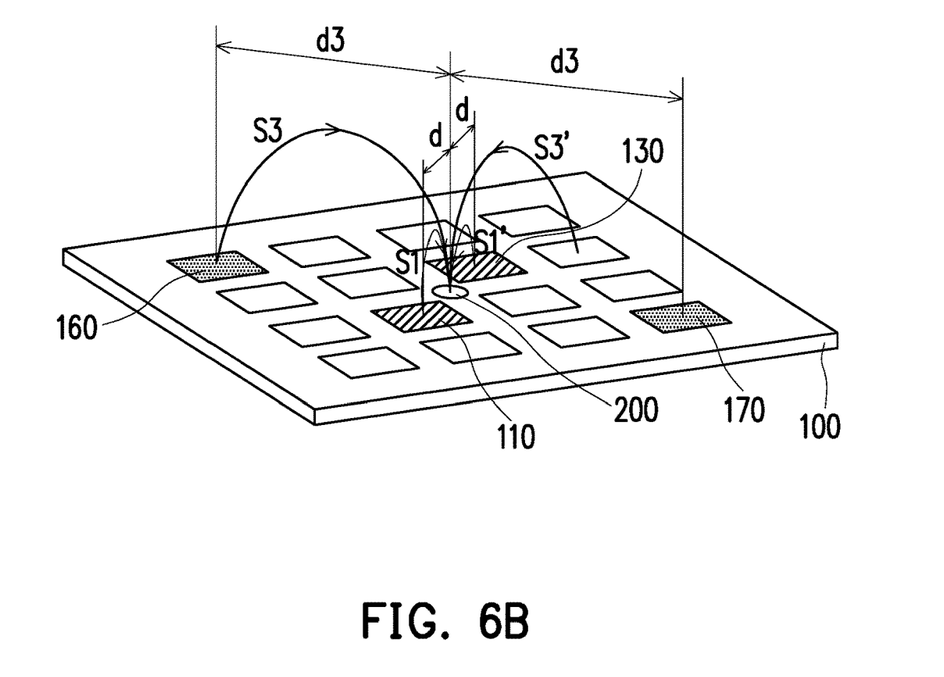

FIG. 6A and FIG. 6B are schematic diagrams illustrating the antenna array 100 when two pairs of antenna units are simultaneously calibrated according to an embodiment of the present disclosure. Referring to FIG. 6A, in the embodiment, the antenna array 100 further includes a fourth antenna unit 140 and a fifth antenna unit 150 for transmitting (or receiving) the second signals S2 and S2', wherein before the fourth antenna unit 140 and the fifth antenna unit 150 are calibrated, the second signal S2 and the second signal S2' may be different. The fourth antenna unit 140 and the fifth antenna unit 150 are respectively spaced apart from the probe 200 by a second distance d2, and the second distance d2 is different from the first distance d. The control circuit 300 may calibrate the fourth antenna unit 140 and the fifth antenna unit 150 according to a second beat frequency of a second signal (i.e., the second signal S2 and the second signal S2') corresponding to the second distance d2 while the first antenna unit 110 and the second antenna unit 120 are being calibrated, wherein the second beat frequency of the second signal corresponding to the second distance d2 is different from the beat frequency fb corresponding to the first distance d.

In FIG. 6B, the antenna array 100 further includes a sixth antenna unit 160 and a seventh antenna unit 170 for transmitting (or receiving) the third signals S3 and S3', wherein the sixth antenna unit 160 and the seventh antenna unit 170 are respectively spaced apart from the probe 200 by a third distance d3, and the third distance d3 is different from the first distance d. Similar to the embodiment of FIG. 6A, the control circuit 300 may calibrate the sixth antenna unit 160 and the seventh antenna unit 170 according to a third beat frequency of a third signal (i.e., the third signal S3 and the third signal S3') corresponding to the third distance d3 while the first antenna unit 110 and the second antenna unit 120 are being calibrated, wherein the third beat frequency of the third signal corresponding to the third distance d3 is different from the beat frequency fb of the signal corresponding to the first distance d.

Figure 7:
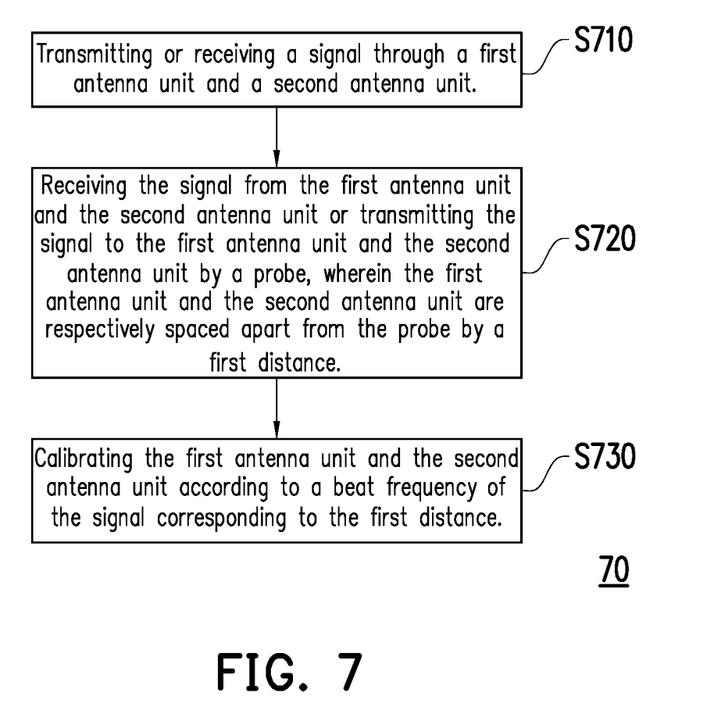
FIG. 7 is a flow chart of a method for calibrating an antenna device according to an embodiment of the present disclosure.

FIG. 7 is a flow chart of a method 70 for calibrating an antenna device according to an embodiment of the present disclosure, wherein the method 70 may be implemented by the antenna device 10 as shown in FIG. 1 or FIG. 2. In step S710, transmitting or receiving a signal through a first antenna unit and a second antenna unit. In step S720, receiving the signal from the first antenna unit and the second antenna unit or transmitting the signal to the first antenna unit and the second antenna unit by a probe, wherein the first antenna unit and the second antenna unit are respectively spaced apart from the probe by a first distance. In step S730, calibrating the first antenna unit and the second antenna unit according to a beat frequency of the signal corresponding to the first distance.

In summary, the present disclosure can calibrate the phase of the paired antenna units in the antenna array according to the beat frequency of the signal of the antenna unit and the signal of the probe. When there are multiple pairs of antenna units on the antenna array, the present disclosure can calibrate multiple pairs of antenna units simultaneously, thereby speeding up the calibration process. The method disclosed herein can be performed at a site with background signal noise and can save a large amount of computing operation.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An antenna device, comprising:
    an antenna array, comprising:
        a first antenna unit and a second antenna unit for transmitting or receiving a first signal; and
        a probe configured to receive the first signal from the first antenna unit and the second antenna unit or transmit the first signal to the first antenna unit and the second antenna unit, wherein the first antenna unit and the second antenna unit are respectively spaced apart from the probe by a first distance; and
    a control circuit coupled to the antenna array, the control circuit calibrates the first antenna unit and the second antenna unit according to a first beat frequency of the first signal corresponding to the first distance.

2. The antenna device of claim 1, wherein the first signal is a frequency-modulated continuous-wave (FMCW).

3. The antenna device of claim 1, wherein the step of calibrating the first antenna unit and the second antenna unit according to the first beat frequency of the first signal corresponding to the first distance comprises:
    adjusting the first signal to make the first signal to reach one of a preset maximum value and a preset minimum value at the first beat frequency.

4. The antenna device of claim 1, wherein the antenna array further comprises a third antenna unit spaced apart from the probe by the first distance and configured to transmit or receive the first signal, and the control circuit is further configured to perform:

disabling the second antenna unit after calibrating the first antenna unit and the second antenna unit; and     calibrating the third antenna unit according to the first beat frequency corresponding to the first antenna unit and the third antenna unit.

5. The antenna device of claim 1, wherein the antenna array further comprises:

a fourth antenna unit for transmitting or receiving a second signal; and     a fifth antenna unit for transmitting or receiving the second signal, wherein the fourth antenna unit and the fifth antenna unit are respectively spaced apart from the probe by a second distance, and the second distance is different from the first distance, wherein     the control circuit calibrates the fourth antenna unit and the fifth antenna unit according to a second beat frequency of the second signal corresponding to the second distance while calibrating the first antenna unit and the second antenna unit.

6. The antenna device of claim 5, wherein the second signal is a frequency-modulated continuous-wave (FMCW).

7. A method for calibrating an antenna device, comprising:

transmitting or receiving a first signal through a first antenna unit and a second antenna unit;

receiving the first signal from the first antenna unit and the second antenna unit or transmitting the first signal to the first antenna unit and the second antenna unit by a probe, wherein the first antenna unit and the second antenna unit are respectively spaced apart from the probe by a first distance; and     calibrating the first antenna unit and the second antenna unit according to a first beat frequency of the first signal corresponding to the first distance.

8. The method of claim 7, wherein the first signal is a frequency-modulated continuous-wave (FMCW).

9. The method of claim 7, wherein the step of calibrating the first antenna unit and the second antenna unit according to the first beat frequency of the first signal corresponding to the first distance comprises:

adjusting the first signal such that the first signal reaches a preset maximum value at the first beat frequency.

10. The method of claim 7, further comprising:

disabling the second antenna unit after calibrating the first antenna unit and the second antenna unit;

transmitting or receiving the first signal through a third antenna unit; and     calibrating the third antenna unit according to the first beat frequency corresponding to the first antenna unit and the third antenna unit.

11. The method of claim 7, further comprising:

transmitting or receiving a second signal through a fourth antenna unit and a fifth antenna unit, wherein the fourth antenna unit and the fifth antenna unit are respectively spaced apart from the probe by a second distance, and the second distance is different from the first distance; and     calibrating the fourth antenna unit and the fifth antenna unit according to a second beat frequency of the second signal corresponding to the second distance while calibrating the first antenna unit and the second antenna unit.

12. The method of claim 11, wherein the second signal is a frequency-modulated continuous-wave (FMCW).

\* \* \* \* \*